G. A. BURR.
Manufacture of Whip-Handle Caps.
No. 138,991.  Patented May 20, 1873.
Fig. 1.
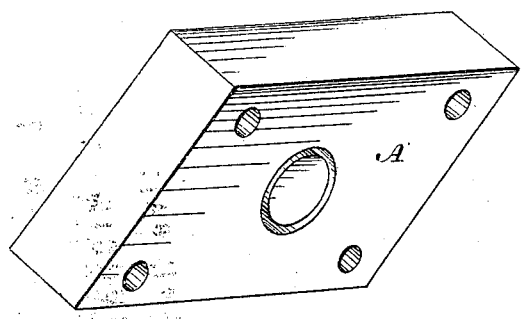
Fig. 3.
Fig. 2.
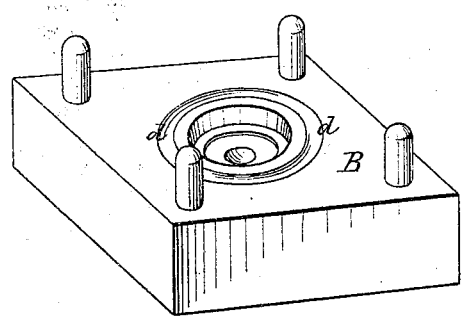
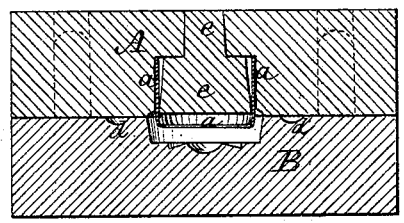
Fig. 4.  Fig. 5.
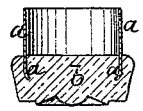
Witnesses.
D. Plowl
Edmund Masson
Inventor.
George A. Burr,
By atty. A. B. Stoughton.
AM. PHOTO-LITHOGRAPHIC CO. N.Y. (OSBORNE'S PROCESS)

UNITED STATES PATENT OFFICE

GEORGE A. BURR, OF FLORENCE, MASSACHUSETTS.

IMPROVEMENT IN THE MANUFACTURE OF WHIP-HANDLE CAPS.

Specification forming part of Letters Patent No. 138,991, dated May 20, 1873; application filed March 15, 1873.

*To all whom it may concern:*

Be it known that I, GEORGE A. BURR, of Florence, in the county of Hampshire and State of Massachusetts, have invented certain new and useful Improvements in the Manufacture of Caps for Whips, Canes, Umbrella-Sticks, and other purposes; and that the following is a full, clear, and exact description of the same, reference being had to the accompanying drawing making a part of this specification, in which—

Figure 1 represents, in perspective and separated from each other, the upper and under die or mold in which the whip-caps in question are made. Fig. 2 represents a vertical section through the dies or mold as they appear when put together. Fig. 3 represents a metallic ferrule, which may or may not enter into the manufacture of the cap in question. Fig. 4 represents a section through one of the caps composed of metal and the composition which I prefer to use, and Fig. 5 represents a section through one of the caps made of composition alone.

The composition which I prefer to use in the manufacture of these caps has for its cementive basis gum shellac, and for its body any mineral or vegetable matter, properly comminuted, that will give it its strength and sufficient degree of hardness; and any coloring matter may be introduced into the composition that is desired to be given to the manufactured article. The shellac may be used alone as the cementive ingredient in the composition, or it may be mixed with any other of the well-known gums or resins; and the gums or resins may be put in solution by any of their well-known solvents, and the mass, before it is molded, may be put in a plastic condition by heating it to a proper temperature; or the mass may be united into a homogeneous compound by heat alone and molded while warm. I am thus particular in mentioning the compound, for it may be made of many of the well-known ingredients, and I do not wish to restrict myself to any particular ingredients or composition, except that they must become plastic under heat, and have an almost stony or bony hardness when cooled, and a degree of strength suitable for the uses they are to be applied to.

My invention consists in making caps for whips, in whole or in part, of a composition of matter of which shellac or its equivalent gum is the cementive or agglutinating constituent and the body of mineral or vegetable matter, or both, that will, when combined with the shellac, produce an article hard, strong, and susceptible of a high finish in the molds or dies in which they are made.

To enable others skilled in the art to make and use my invention, I will proceed to describe the same with reference to the drawing.

A represents the upper and B the under section of molds or dies in which the caps are made, the shape and ornamentation being given to the caps in said dies or molds. In Fig. 3 is shown a metal ferrule, $a$, around one end of which the composition, as shown at $b$, Fig. 4, is cast, which makes a very substantial cap, as the butt of the whip or top of the walking or umbrella stick may be then inserted in metal and tightly secured therein. But a very strong and durable cap, as at $c$, Fig. 5, may be made entirely of the plastic material, which, when cooled, is of a stony or bony nature, and quite tenacious. In the molds, as shown in Fig. 1, there is a groove, $d$, around the recess, (also shown in Fig. 2,) in which the excess of the composition may pass when the molds or dies are brought tightly together. In Fig. 2 is shown the ferrule $a$ in the mold or die, and a plug, $e$, in the ferrule, to control the height at which the composition shall be molded upon the ferrule, as shown in the finished article, or a section of or through it at Fig. 4. When, however, the cap is to be made entirely of the composition, as shown in Fig. 5, then, of course, the ferrule is omitted, and a plug, which is of the form and taper of the inside of the cap $c$, is used instead of the one shown at $e$, so that by simply changing the plugs one or both forms of the caps may be made in the same kind of molds or dies.

Having thus fully described my invention, what I claim is—

Caps for whips and other similar purposes made out of a composition of which shellac or its equivalent gum or resin is the cementive ingredient, and whether united to a metallic ferrule to form a part of the cap or not, as herein described and represented.

GEORGE A. BURR.

Witnesses:
JOHN M. TURNER,
D. W. BOND.